(12) United States Patent
Williams (10) Patent No.: US 6,351,737 B1
(45) Date of Patent: *Feb. 26, 2002

(54) MEASUREMENT APPORTIONMENT SYSTEM

(76) Inventor: Paul Nicholas Williams, 6 Lawn Avenue, Etwall Derbyshire (GB), DE65 6JB ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,220
(22) PCT Filed: Aug. 8, 1996
(86) PCT No.: PCT/GB96/01937
§ 371 Date: Jun. 4, 1998
§ 102(e) Date: Jun. 4, 1998
(87) PCT Pub. No.: WO97/06442
PCT Pub. Date: Feb. 20, 1997

(30) Foreign Application Priority Data

Aug. 8, 1995 (GB) .............................................. 9516219
Apr. 22, 1996 (GB) .............................................. 9608306

(51) Int. Cl.[7] .............................................. G06F 17/60
(52) U.S. Cl. .............................. 705/34; 705/30; 705/412
(58) Field of Search ........................... 705/30, 34, 400, 705/412, 413

(56) References Cited

U.S. PATENT DOCUMENTS 4,075,699 A * 2/1978 Schneider et al. .......... 364/492
5,842,187 A * 11/1998 Williams .................... 705/412

FOREIGN PATENT DOCUMENTS

| AT | 392 163 B | 2/1991 |
| EP | 0534 726 A1 | 3/1993 |
| EP | 0655 821 A2 | 5/1995 |
| GB | 2258052 A | 1/1993 |
| JP | 63-283730 | * 11/1988 |
| WO | WO 95/26065 | * 9/1995 |

OTHER PUBLICATIONS

Mularz : "Statistical Origins ans Concepts of Point Scoring";Credit World, Mar./Apr. 1987, v75, n4, pp. 50–51. (Abstract Only).*

* cited by examiner

Primary Examiner—Edward R. Cosimano
(74) Attorney, Agent, or Firm—Lowe Hauptman Gilman & Berner, LLP (57) ABSTRACT

The rate of consumption from one or more values of metered consumption is determined by (1) a value of consumption or charge therefrom using a period other than the Metered Period (the period during which the value of consumption was recorded), (2) aggregating values of rate of consumption corresponding to a plurality of metered locations, and (3) producing aggregate values of consumption or charge therefrom. The corresponding Metered Periods vary. The rate of consumption validates the value of metered consumption.

10 Claims, 7 Drawing Sheets

MEASUREMENT APPORTIONMENT SYSTEM

It is becoming increasingly desirable to calculate a value of consumption (for example electricity consumption) or a charge (the cost of consumption) relating thereto in a technically efficient manner and where the price (the per unit price) from which the charge is derived relates to a period other than the period during which the consumption is recorded.

Various systems are used to measure quantities over time. An example is the measurement of utility supply such as electricity. Such measurements provide a recorded value corresponding to a period of time (the Metered Period), potentially where the Metered Period is not continuous.

This measured value is then frequently combined with other data that relates to the same period as the Metered Period of the measured value. In the case of electricity supply (or the supply of other utility services) the measured value of consumption can be combined with a unit price for the Metered Period to produce a price, or charge, for the supplied electricity.

The present system proposes to use information relating to sub-periods of the Metered Period, or the Metered Period itself, to calculate a rate of measurement (or rate of consumption). The system then proposes means that use this rate of consumption to overcome various technical difficulties in prior art systems. The system is principally detailed by reference to electricity supply although it can be applied to a range of other measurement systems.

At present the supply of electricity and other utilities, such as gas, is commonly metered at various points within the associated distribution network, including the consumer premises.

For the supply of gas and electricity there are generally three forms of metering. The first is a single-rate meter which simply records the total cumulative consumption. Second is a multi-rate meter which accumulates consumption into one of a number of values (registers) depending upon time. In this second type each register contains the cumulative consumption during the period that the register is enabled (which may be a non continuous period). The third records consumption in defined finite periods (Fixed Periods) as a series of consumption values with one value per period.

Where a meter accumulates consumption into a register, a value of consumption can be obtained for the finite period between two reading of the register by taking the difference in the register's value at each of the readings. Irrespective of the type of metering equipment, it is therefore possible to determine a value of metered consumption for a metered supply that corresponds to a known finite period of time (the Metered Period). Where multi-rate metering is used, the Metered Period may not be continuous, as a result of the metering equipment recording consumption at different times into different registers. This is frequently referred to as "switching", where the recording is switched periodically between different registers. Generally, at any point in time only one register is enabled for recording of consumption. Where recording of measurements in a register is periodically switched on and off, the corresponding Metered Period will not be continuous and will be the period of time during which recording in that register was enabled.

At present it is common for a variety of different forms of meter to be used within a distribution system. Different consumers will therefore have different meters, depending upon their specific requirements and history. Interconnections between different parts of the distribution network are also commonly metered with relatively advanced metering (Network Metering). Using such Network Metering it may be possible to determine, to the resolution of the Network Metering, the total consumption within a corresponding section of the distribution network (but not necessarily the consumption of a specific subsection of the consumers connected to it).

As stated, some metering can be used to record associated consumption within fixed periods of time (for example half hour periods). Thus, provided that meters are synchronised, it is possible to arrange for a plurality of such meters, each potentially situated at a separate location, to record consumption during the same fixed periods. Given that such metering is provided, it is possible for systems (including metering systems or systems associated with the meters) to combine, or use, data for a given period from more than one meter. Thus a meter outstation connected to a number of meters can retrieve data from each of the attached meters and for each period aggregate the consumption recorded by each individual meter to provide a total value of consumption for the period. It can then do this for each measurement period.

Where a wholesale market for electricity is operated, a unit price may be set for defined periods (the Accounting Periods). Even where a wholesale market does not operate, it may be desirable to account for the commodity supplied in terms of a unit price (or other parameter) specific to particular periods (these being Accounting Periods). Where metering records consumption for equivalent periods a cost can be determined for any such metered point (or collection of metered points) by multiplying the metered consumption for an Accounting Period by the unit price for the period. This necessarily requires the metering to record consumption for each Accounting Period. For a given Accounting Period it would also be possible to aggregate the consumption from such metering systems. Such a solution is possible using advanced metering but this is expensive and even on a limited scale creates technical difficulties and complexity in the recording, retrieval and processing of the metered data. Using such advanced metering it is therefore possible to determine a cost for an Accounting Period and to determine the aggregate consumption for any group of customers (providing that they have such metering).

The problem with most widespread metering systems, such as those used for utility supply, is that (1) the Metered Periods for individual metered locations are relatively long (typically months) and (2) the Metered Periods for different locations are not the same, thus not allowing aggregation of the Metered Consumption values.

The prior art means for determining a charge for an individual consumer (for example of electricity) is to derive it directly from metered date for the consumer obtained from the metering equipment at the consumer location. The charge is generally a per unit price multiplied by the value of Metered Consumption. In the prior art means the per unit price is valid for the whole of the Metered Period. The present system provides a means to derive a charge for one or more consumers where the charging interval (the time during which a particular price is valid) is not equal to the Metered Period and particularly where the charging interval is a sub-period of one or more of the metered periods.

A system is proposed in patent apply no WO 95/26065, 28.09.1995 (PCT/GB95/00636, 22.03.95) providing means to monitor an electricity distribution network and thereby to produce a value of consumption for a metered supply for a period other then the Metered Period for that supply. We will term this system the WO system.

The WO system provides various means whereby if a metered location accounts for a given fraction of the network demand during the Metered period of the particular metered location, then a value of consumption can be apportioned to a sub-period of the Metered Period (provided that a value of network demand is available for the period) by apportioning a similar fraction of the location's metered consumption. Where metered data is not available for some part of the network demand, the system further provides means to estimate consumption for those consumption points for which metered data is unavailable and to adjust these estimates so that in aggregate they equal the network demand not accounted for by metered data.

The WO system is dependent for its operation upon the use of Network Metering for defined finite periods in order to determine the total electricity consumption within an electricity distribution network.

The WO system considers the situation where metering exists that can be configured for defined periods and where metering at different locations within the distribution network can be synchronized and configured to record consumption during the same periods. Using this system, processing specific to the individual Metered Period is required to produce a value of consumption for a sub-period of the Metered period. Thus processing must be repeated if another value of consumption is required for a second sub-period of the Metered period. This produces complexities, and may be inefficient, when applied on a large scale or where different metered locations are not capable of providing metered consumption for the same metered periods.

The present system is intended to deal primarily with metering systems that simply provide cumulative total consumption in one or more registers. To support such metering equipment, the present system provides a technically efficient means to calculate a rate of consumption that can be used for a number of purposes including producing a value of consumption for a sub-period of the Metered Period. However, the same rate of consumption value can be used to produce separate values of consumption for a number of sub-periods. The rate of consumption only needs to be generated once and is the only processing that is specific to the individual Metered Period. This represents a significant technical innovation compared to the WO system.

Generally speaking, the prior art systems can be classified into three forms.

In a first general form of prior art system, a plurality of metering systems are synchronized and arranged to each record consumption during the same finite periods. It is possible to aggregate the values of metered consumption obtained from such meters.

A second form of prior art system broadly produces a value of charge by using per unit pricing that is applied to metered data from either an individual meter or meter register or the aggregate value of metered consumption for a finite period for a plurality of metered supplies, where the metering is arranged to record consumption at each of the metered supplies during the same finite periods. The per unit price is constant for the whole of the Metered Period.

A third form of prior art system is the WO system.

The general intention of the present invention is to provide a means to calculate values of consumption and/or charge for periods other than the Metered Period and without reference to Network Metering, thereby overcoming the limitations of the second and third forms of known system. The present system also enables data (rate of consumption) relating to different metered locations to be aggregated even where the associated Metered Periods are different (thus removing the limitation of the first form of known system. Additionally, the present system does not require Network Metering to operate, so overcoming the limitation of the third form of known system. The present system is intended to provide a system that is technically more efficient than the WO system when dealing with general metering (where metered locations usually have different Metered Periods).

The present system recognises that the majority of installed meters do not, or cannot, currently record consumption during fixed periods (such as Accounting Periods). Generally most meters are read manually by a person visiting the meter and visually, or by hand-held unit, reading the metered data. Naturally, where meters only record cumulative consumption the Metered Period of two meters are unlikely to be the same. The present system proposes means to determine:

a rate of consumption;

a value of consumption for a period other than the Metered Period;

a charge for a period (whether or not the period equates to the Metered Period) based upon prices specific to periods which are not the metered period;

a means for producing a value of consumption (demand) representing more than one metered location where metered consumption is not available from each metered location for the same period of time;

a means for data from more than one location to be aggregated prior to calculating a charge even where the Metered Periods are not the same; and a means for adjusting the above in dependence to the demand within a part of the distribution network.

Various further features of the system will become apparent from the following description of various embodiments thereof, given by example and with reference to the drawings, in which.

Using prior art metering, a value of consumption can be obtained from the metering equipment corresponding to a relatively long period of time (the Metered Period). Where the Metered Period does not equate to an individual Accounting Period (which would allow direct calculation of a charge value by prior art means), it is possible to define a weighting for each Accounting Period.

The value of Weighting can be generated by a number of means. Its purpose is to define the relative apportionment of the Metered Consumption between the different Accounting Periods. If the Weighting's value was constant for all periods, then Metered Consumption would be apportioned equally between the periods. However, it is proposed that the Weighting's value varies such that it represents an average consumption behaviour for the associated sub-periods. For example, in Accounting Period X the customers (or particular types or categories of customers) may generally consume twice as much electricity as they do in Accounting Period Y. Thus the Weighting for X will be twice that for Y. In the proposed system the absolute value of the Weightings are not important. However, in specific implementations it may be important and it may be necessary to ensure, for example, that the sum of the Weightings, say, for one day or year equals 1.00 (unity).

An alternative to having pre-defined values for the Weighting for a particular period is to dynamically generate them in dependence to external factors such as the demand within the supply network, climatic factors, etc. Alternatively, predefined Weightings could be varied by dynamic factors.

Figure 1:
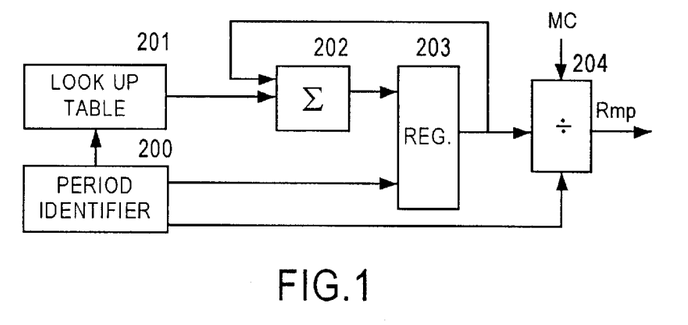
FIG. 1 shows a means for generating a rate of consumption value.

Depending upon the nature and configuration of the metering equipment used, the Metered Period may or may not be continuous and will partly or completely encompass one or more Accounting Periods. Whatever the form of the Metered Period, it will contain, completely or partially, a finite number of Accounting Periods. FIG. 1 shows an implementation of part of the present system. It is intended that the circuit shown in FIG. 1 determines a value indicating the rate of consumption (Rmp), associated with a value of metered consumption (MC).

Unit 201 can be implemented as a look-up table which can be provided by means of memory, ROM, logic circuit or other device. The purpose of unit 201 is to provide an output based upon the period identifier input from unit 200. If all of the Accounting Periods were numbered then the identifier could be represented, for example, by an integer value (alternatively it could be represented by a plurality of values, for example representing year, month, day and period). The output of unit 201 can be referred to as a Weighting and for input (period identifier) i the output can be referred to as Wi.

Unit 200 will sequence through Accounting Periods (or at least those encompassed in the Metered Period) outputting an identifier for each period to unit 201. In a digital system this identifier could, conveniently, be an integer value representing the Accounting Period number (with some defined time and date being the datum). For the current period identifier input unit 201 will generate the weighting for the associated customer (or customer group, meter register type, customer type, location, supply network or combination thereof) and will output this weighting to unit 202. Unit 202 provides an output which is the sum of its two inputs.

Unit 203 is a loadable register (or other storage element) and is controlled, in the implementation shown in FIG. 1, by unit 200. Thus for each period selected by unit 200, unit 203 will be loaded with a new value (the output of unit 202). Obviously such control could alternatively be provided by means separate to unit 200 but implementing the same function.

In order to produce Rmp, unit 200 must select each Accounting Period within the metered period of MC (the value of Metered Consumption). Where the metered period is a continuous period of time, this will require unit 200 simply to sequence through the Accounting Periods contained in the metered period, output the Accounting Period identifier to unit 201, and control the loading of unit 203 (allowing for unit 201 and 202 sufficient time to operate). Where the metered period is not continuous, unit 200 could skip those Accounting Periods not contained in the metered period or could prevent unit 203 from being loaded with a new value whilst those periods (ie those are not contained in the Metered Period) are selected.

Figure 2:
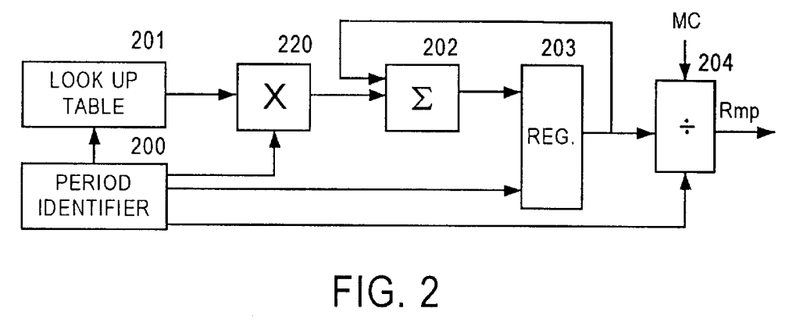
FIG. 2 shows an alternative means for generating a rate of consumption value where the value of metered consumption can have a non-continuous metered period and or where the control means can be independent of the metered period.

In FIG. 1, unit 200 only selects Accounting Periods (outputs a period identifier to unit 201 and causes the loading of unit 203) where the periods form part of the metered period of MC. However, this makes unit 200 specific to the metered period in question. FIG. 2 shows an alternative implementation that overcomes this limitation and provides some additional benefit.

A unit 220 is added between unit 201 and unit 202 (which both operate as previously described). Unit 220 multiplies the output from unit 201 by a factor (F) derived from the period identifier (i) for the Accounting Period currently selected by unit 200. Either F can be generated within unit 200 and output to unit 220 or it can be generated, from the period identifier i, within unit 220. Unit 220 then implements the function:

$$W \times F \qquad \text{(Equation 1)}$$

The multiplication factor F indicates the percentage of the Accounting Period encompassed within the Metered Period being considered. Thus if the Accounting Period currently selected by unit 200 is wholly contained within the metered period of MC then F will be 1. If the Accounting Period is not contained within the metered period then F will be 0.

It may always be adequate for the Metered Period to be rounded such that it is considered as a set of whole (integer) Accounting Periods. In this case the value of F will not need to represent fractional parts and would only need to represent 0% (where F is 0) and 100% (where F is 1). If the Metered Period only contained whole Accounting Periods and unit 200 skipped all Accounting Period not contained in the Metered Period, then the value of F can always be implied to be 100% (and, as illustrated in FIG. 1, is not physically required).

The function W×F could also be implemented as part of unit 201, saving the need for a dedicated signal between unit 200 and unit 220. However, this would mean that unit 201 was specific to a given Metered Period. The advantage of the system shown in FIG. 2 (with 220 generating F internally from the period identifier provided by unit 200) is that only unit 220 is specific to the particular Metered Period.

Figure 15:
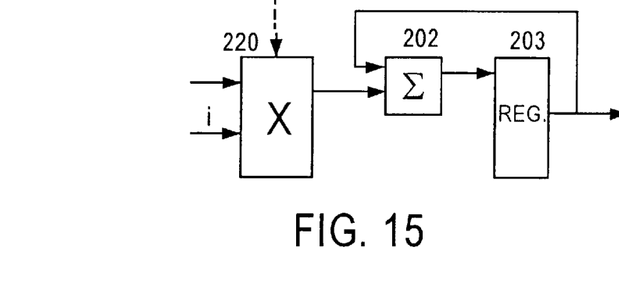
FIG. 15 shows the connection of unit 220.

The present system makes extensive use of unit 220. FIG. 15 illustrates the general configuration where a unit 220 is connected to a combination of a unit 202 and a unit 203. The overall circuit will be designed to produce a aggregate value (either weighting or the weighted price) as detailed herein for a period of time (the Associated Period or Supported Period). Unit 220 either will know, be able to generate, or be able to obtain the mapping of Input Periods (the periods of the identifier i which will generally be the currently selected Accounting Period) to the Associated Period. For example, if the Input Periods are Accounting Periods then the mapping could be achieved by look-up table or logic function such that it generates a logic zero (or False) if the identifier for the Input Period is not contained within the Associated Period and a logic one (or True) if the Input Period is contained within the Associated Period. Thus if, for example, the Associated Period is 0:00 to 06:00 hours between Jan. 1, 1994 and May 1, 1994 inclusive then the mapping will, for the given examples, generate the following outputs:

| | | |
|---|---|---|
| 01:00 | Dec. 30, 1993 | False |
| 01:00 | Jan. 30, 1994 | True |
| 06:30 | Jan. 30, 1994 | False |
| 00:30 | May 2, 1994 | False |

The proposed circuit can additionally be implemented to account for the situation where an Input Period is partially encompassed by the Associated Period. If the selected Input Period is partially contained in the Associated Period, then unit 220 can output a value which is a function of the Primary Input (which will either be a value of weighting or weighted price). It is proposed that the value output by unit 220 to unit 202 could be equal to X% of the Primary input's value where there is X% (by time) of the Input Period within the Associated Period. This can be achieved by the modifying the mapping so that it outputs a value representing the overlap between the Input Period and the Associated Period.

Thus if IP denotes the amount of time (for example number of minutes) in the Input Period and OP denotes the amount of time (using the same units as IP) that the Input Period overlaps with the Associated Period then the output of unit 220 could be defined by:

$$(OP/IP) \times PI$$

where PI is the value of the Primary Input (being either the Weighting or Weighted Price). If unit 220 implemented this function, then it would cover the situation where the whole of the Input Period was within the Associated Period (OP=IP) and where there is no overlap (OP=0).

Alternatively, unit 220 can utilise optional inputs to vary the above function. Potentially overall demand (or demand associated with a group of consumers) may be greater during parts of an Input Period, for example the first part. Thus the above function can be varied to reflect the demand seen in the distribution network. For example, if two-thirds of the demand in an Input Period occurs in the first half of the period, which is the portion encompassed by a particular Associated Period, then the corresponding unit 220(s) could similarly apportion two thirds of their Primary Input to determine the output value.

Unit 220 could alternatively work by disabling the loading (updating) of unit 203 whilst the period identifier input to the unit 220 is not contained within the Associated Period for the unit. In such an implementation, the unit 220 need not affect the Primary Input, which could be connected directly to unit 202. However, such an implementation, unless extended as described above, would not allow partial overlap of an Input Period to the Associated Period.

The FIG. 2 system operates substantially as the system shown in FIG. 1. Unit 203 stores the output of unit 202. It is loaded under control of unit 200. After selecting a period, unit 200 can allow sufficient time for unit 201 and 202 (and if implemented unit 220) to operate after which unit 200 causes unit 203 to be loaded with the current output of unit 202. Such operation can be implemented as a synchronous (or clocked) digital system. However, other technologies exist and the present system does not exclude implementation in such alternatives.

Once unit 200 has selected all Accounting Periods either wholly or partially contained in the Metered Period unit 203 will contain a value of aggregate weighting for the Metered Period. Unit 204 divides the value of Metered Consumption (MC) by the aggregate weighting for the Metered Period. Thus, unit 204 provides a value representing the rate of consumption per unit of weighting.

Figure 3:
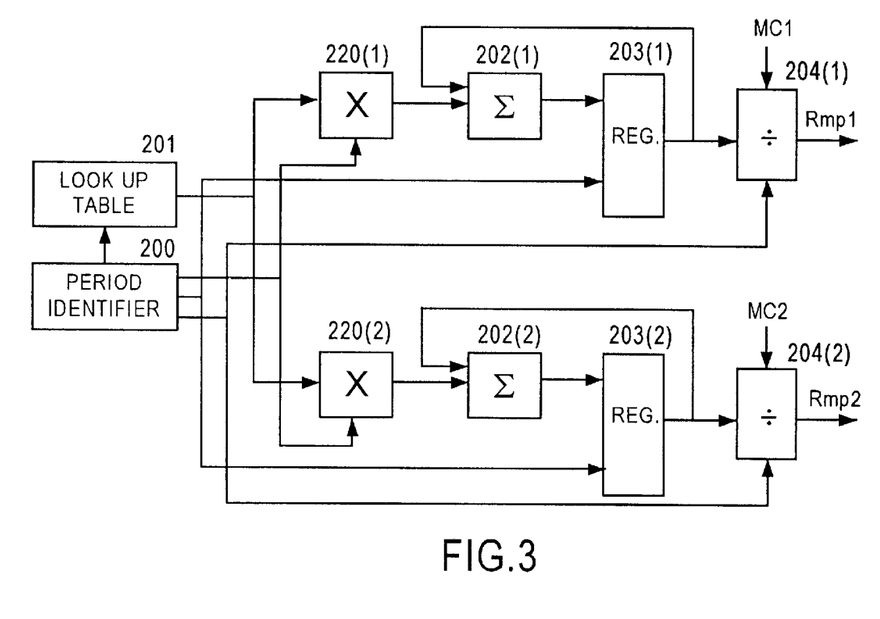
FIG. 3 shows a development of FIG. 2 capable of supporting multiple values of metered consumption and producing a rate of consumption for each.

FIGS. 1 and 2 illustrate implementations of the system for a single value of metered consumption. They can be expanded to support multiple values of metered consumption, multiple registers and multiple metered locations. It would then be possible to make various units common to more than one of the calculations. For example, a single unit 200 could sequence through all appropriate Accounting Periods. Also, unit 201 could be common for calculations using the same source of weighting (for example the same type of customer). However, in FIG. 2 the multiplication factor F would need to be produced specific to each Metered Period, and the preferred embodiment is therefore the system illustrated in FIG. 2, where unit 200 outputs the period identifier for the selected Accounting Period to unit(s) 220 which then calculate F internally. This means that each unit 220 is specific to an individual Metered Period. However, unit 200 and unit 201 can be common to multiple calculations. FIG. 3 illustrates an embodiment that determines the rate of consumption for two values of Metered Consumption (which may relate to the same metered location or different locations). For example, the values of Metered Consumption could be from the two registers of a two rate meter. Unit 200 and unit 201 are shared and thus both values of Metered Consumption must be associated with the same values of weighting (although the Metered Periods need not be the same). Units 220, 202, 203 and 204 are then replicated, one set per value of metered consumption. In this implementation each unit 220 would need to generate F to reflect the associated Metered Period including switching times (the times that measurement recording was active between).

Such a system could be implemented in a variety of different forms including within the hand held units commonly used to retrieve metered date. Such hand held units are generally based around a microprocessor with the hardware and embedded software specific to the purpose.

In such an implementation unit 201 could be implemented for each type of weighting (where there are different types of weighting (to differentiate patterns of consumption) associated with different regions, customer types, tariff options, etc.). The microprocessor could then be conveniently designed to implement units 220, 202, 203 and 204. For each meter reading obtained the unit would then configure these functions for the meter reading (for example, unit 220 would be configured for the Metered Period and register switching times, where the measurement uses a switched register (one in which recording is not continuous)). This may require knowledge of the time and date (or just the date) of the previous meter reading, and this information could be downloaded into the hand held unit prior to use. It would also require unit 201 to generate values of Weighting for all Accounting Periods contained in the Metered Period. The hardware or microprocessor could then implement units 220, 202, 203 and 204, producing the rate of consumption corresponding to the metered consumption value. Both values (Metered Consumption and rate of consumption) could then be stored to memory for subsequent download to the data retrieval system or computer system.

Such an implementation of the present system would require the hand held unit (or other data collection system) to be provided with data relating to each metering system. An alternative would be for the aggregate weighting to be produced by a separate embodiment of the present system (the External System) and downloaded to the hand held unit (or data collection system) prior to the unit, or system, being used for data retrieval (the reading of metered consumption). The External System would therefore implement units 200, 201, 202, 203 and if necessary unit 220 and for each metering system (or, if appropriate, each meter register) the output of unit 203 would be downloaded to the hand held unit or data collection system. This would avoid the need for the hand held unit, or data collection system, to implement these functions and they would only need to implement unit 204. The hand held unit (or data collection system) would also not need to know the time of the last meter reading and would not need to generate the required values of weighting. Such an implementation assumes that the Metered Period (and specifically the end of the Metered Period) is known, or can be estimated, with sufficient accuracy by the External System.

Where the exact time that the metered consumption is retrieved is important, a further alternative form of the present system could be implemented. Both the External System and the hand held unit (or data collection system) could implement units 200, 201, 220 (optionally), 202 and 203. The hand held unit (or data collection system) would additionally implement unit 204. The external system would generate an aggregate weighting (output of unit 203) up to a defined point in time (the Fixed Time) (for example the previous midnight). This can be achieved by unit 200 only selecting Accounting Periods up to the Fixed Time, unit 203 not being loaded whilst any Accounting Period after the Fixed Time is selected or F (the multiplication factor used in unit 220) could be 0 for any period after the Fixed Time. This interim aggregate weighting (representing the aggregate weighting up to the Fixed Time) can be downloaded to the hand held unit, or data collection system, which can use it to pre load their corresponding unit 203. Once the exact time of data retrieval (meter reading) is known (or is known or can be estimated with sufficient accuracy and resolution), the embodiment of the present system within the hand held unit, or data collection system, can be used to calculate the final value of aggregate weighting (including the final part of the metered period) and, using unit 204, calculate the rate of consumption. This can be achieved by unit 200 selecting the Accounting Periods between the Fixed Time and the end of the Metered Period (and for any earlier periods either unit 200 not selecting them or unit 201 generating a 0 for the weighting or F masking them or unit 203 not being loaded whilst they are selected) and thereby the value contained in unit 203 being updated to provide the final value of aggregate weighting. Such an implementation would avoid the need for the hand held unit to be programmed with the time and date of previous meter readings, and the unit 201 in the hand held unit would not need to generate weightings for period prior to the Fixed Time.

When embodying the system into hand held units (or other data collection systems) the rate of consumption could beneficially also be used to validate the meter reading (value of Metered Consumption) obtained. When meters are read by means of a personal visit, the meter reading period will frequently vary by significant amounts. Thus the amount of consumption in the current Metered Period cannot be compared to the value for the previous Metered Period. Even when the two Metered Periods are of similar duration, they may relate to different periods of the year and therefore the two values of metered consumption could vary dramatically. Also, where consumption is recorded in a set of switched registers, the switching times could be changed periodically and this would affect the values of consumption recorded in each register. If the values of weighting are designed to reflect changing consumption behaviour (for example if they reflect the changing pattern of consumption in the overall network or some sub-set of customers) then the rate of consumption should be fairly consistent between successive reads (particularly when the Metered Periods are relatively long). A marked difference in the rate of consumption would indicate a fault in the metering, tampering, fraud, or a fundamental shift in the consumer's behaviour (in which case it may be appropriate to allocate them to a different type of weighting pattern). Provided that the hand held unit had, or could derive, the rate of consumption for the previous meter reading, it could check that the rate of consumption for the current meter reading is within a certain tolerance of the previous rate value.

The present system, and its ability to validate values of metered consumption by reference to the corresponding rate of consumption, could alternatively be implemented in a data retrieval (or communication) systems used for the transfer of metered data. It could also be incorporated into the systems used to process metered data.

The circuit shown in FIG. 1 (or FIG. 2) could also be incorporated into the metering equipment provided that such equipment had, or could produce, the necessary weighting information (unit 201). This could be achieved, for example, by radio broadcast or by future values of weighting being downloaded into the meter at each meter reading.

If the present system is used to validate values of metered consumption by reference to the corresponding rate of consumption, then it can be arranged for an indication or warning to be given to the user regarding the outcome of the validation. Thus if the new rate of consumption (calculated from the new Metered Consumption) is not within a certain tolerance of the previous rate of consumption, a user warning could be produced. The form of this warning would be dependant upon the implementation of the present system but could consist of an audible warning and/or a displayed message. Also, where the present system performs validation, interfaces to other systems and downloads the rate of consumption to those system, then the system could also download a signal (or in digital systems a flag) indicating the result of validation.

The output of unit 204 is extremely useful. It is possible to determine a value of consumption for any period using the output of unit 204. Multiplying a value of Rmp (the output of unit 204 in FIGS. 1 and 2) by the weighting for a period will give an estimated value of consumption for the said period. Thus the weightings for a whole year can be used to produce an annualised value of consumption, the weightings for a future period of time can be used to produce an estimate for the projected consumption in that period, and the weightings for a period (for example an individual Accounting Period) within the Metered Period can be used to apportion a value of consumption to a sub-period of the Metered Period. Where the values of weighting are designed to add up to 1.00 over a period of time (for example a year), then the rate of consumption will equal the projected consumption during that period. The values are then interchangeable.

Figure 4:
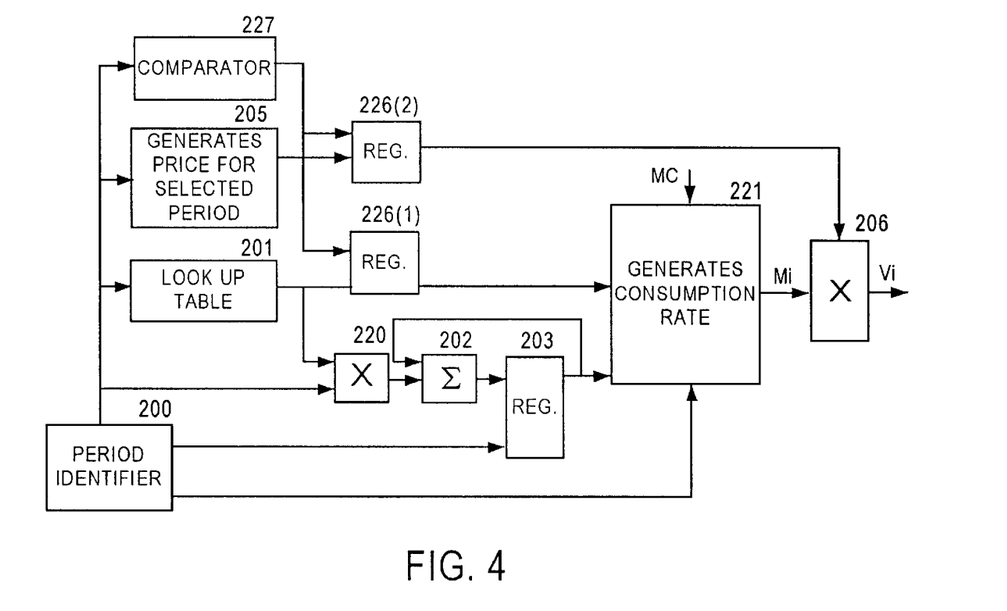
FIG. 4 shows a further form of the present system whereby a value of charge and consumption is produced for sub period of the metered period.

FIG. 4 illustrates a further implementation of the present system that produces a value of consumption for an individual Accounting period (the Charging Period) and/or a charge for the Charging Period. Units 200, 201, 220 (if required), 202, and 203 operate as previously described.

As unit 200 selects Accounting Periods (by outputting a period identifier), unit 227 tests to determine whether the currently selected Accounting Period equals the Charging Period. If it is then unit 227 causes unit 226(1) (which is a loadable register) to be loaded with the output value of unit 201 (the weighting for the period) and unit 226(2) (which is also a loadable register) to be loaded with the output value of unit 205. The output of unit 205 is the price for the selected Accounting Period. It is therefore necessary for unit 200, during the course of its operation, to select the Charging Period at some stage.

Once unit 203 contains the aggregate weighting for the Metered Period, unit 221 can generate the rate of consumption (as per unit 204) and, once the Charging Period has been selected by unit 200, then multiply the rate of consumption by the output of unit 226(1) (the weighting for the Charging Period). This will produce a value of consumption for the Charging Period. Unit 206 then multiplies this by the output of unit 226(2) (the price for the Charging Period) to produce a charge value. Obviously unit 206 can be excluded if a charge value is not required.

Figure 5:
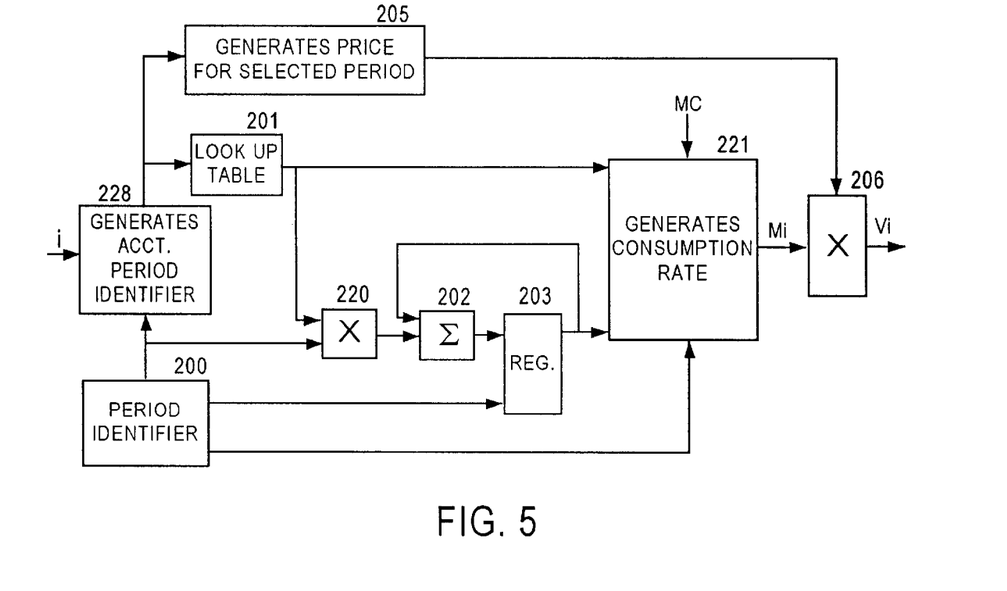
FIG. 5 shows an alternative form of FIG. 5.

Rather than implement units 226(1), 226(2) and 227, a unit 228 can be implemented under the control of a state machine or other similar control circuit. FIG. 5 shows such an implementation (excluding the state machine). The state machine would allow unit 200 to sequence through the required Accounting Periods in order that unit 203 contains the aggregate weighting for the Metered Period and during this operation unit 228 will output the Accounting Period identifier for the period currently selected by unit 200 (ie its input from unit 200). Once unit 203 contains the aggregate weighting, the state machine can control unit 228 to output the value on its other input (labelled "i"). This is the identifier for the Charging Period (which is an Accounting Period). Unit 201 and 205, being lookup tables or similar, will then output the weighting and price for this Accounting Period but unit 203 will not be updated. Units 221 and 206 can then operate to produce the values of consumption and charge.

The state machine (or control means) can, for example, be implemented in unit 200.

In FIG. 5 unit 220 receives an input directly from unit 200. This is used to provide, or to produce, the multiplication factor F used by unit 220. If unit 220 requires the period identifier for this purpose it does not affect the operation whether unit 220 receives this input from either unit 200 (as shown) or the output of unit 228.

Where a value of consumption is required for a period other than an Accounting Period, then a circuit equivalent to the combination of units 200, 201, 220, 202, and 203 (as connected in FIG. 2) can be used to calculate the aggregate weighting in the required period (the Estimation Period). This will require unit 200 to select at least those Accounting Periods contained in the Estimation Period. Where either (a) the Estimation Period contains partial Accounting Periods or (b) unit 200 selects Accounting periods not contained in the Estimation Period then the multiplication factor F, used in unit 220 (and/or the control of unit 203), will need to indicate the percentage of the currently selected Accounting Period contained in the Estimation Period. This aggregate weighting for the Estimation Period can be input to unit 221 (in FIG. 4 instead of the input from unit 226(1) and in FIG. 5 instead of the input from unit 201). The output of unit 221 will then be a value of consumption for the Estimation Period.

Using prior art metering, the values of metered consumption obtained from different metered supplies (consumers) frequently have different metered periods. Sometimes the meters are configured differently, for example one or more may be configured to record consumption using a plurality of registers (each register recording consumption during specific times) end the configuration of different meters may vary. Also, where the meters record cumulative consumption (either into a single register or a plurality of registers), rather than the consumption during finite periods, the timing of the current and previous readings is significant and it is unlikely that a large number of meters will have identical timings for both the current and previous readings. Because the metered period varies between consumers it is not possible to simply add their values of metered data to determine the total consumption in a given period. Thus it would not be possible to determine the total amount of consumption for a given week simply by adding meter readings together even if meters were read on a weekly basis (because some readings will be taken on Monday, some on Tuesday, some on Wednesday, etc.).

The present system does enable aggregation to be performed. To aggregate consumption during a period (the Aggregation Period), the sum of the weightings during the Aggregation Period can be calculated (using a system equivalent to units 200, 201, 202, and 203), this value being referred to as the Aggregation Period Weighting or Wap. Using the value Rmp for consumers, it is then possible to multiple each value of Rmp by the Aggregation Period Weighting (Wap), thereby producing a value of consumption for each consumer for the Aggregation Period, and aggregate the results.

However these calculations would need to be repeated for each Aggregation Period. Thus the number of calculations is proportionate to the number of customers multiplied by the number of Aggregation Periods. Therefore if the Aggregation Period is relatively short, for example a day, compared to the metered periods (which may be of the order of several months) then the number of calculations would be significant and could produce its own technical difficulties. The preferred embodiment utilises a beneficial feature of Rmp. The output of unit 204 gives the rate of consumption (associated with a value of metered consumption) valid during the whole of the associated Metered Period (or any part thereof). It is possible to directly add values of Rmp for different consumers (or meter registers) to produce an aggregate Rmp. This value of aggregate Rmp is valid for the period of time common to all of the individual values of Rmp (ie the Metered Periods associated with each value of Rmp). Outside of this common period, the aggregate Rmp could still be used to estimate the total rate of consumption for the group of customers (or meter registers) and could be used to estimate the consumption of the group in any period of time.

To calculate a value of consumption for an Aggregation Period for the whole group of customers (or meter registers) simply requires the aggregate Rmp to be multiplied by the Aggregation Period Weighting. The calculations are therefore proportionate to the number of Aggregation Periods plus the number of metered consumption values. This is therefore technically efficient to implement, particularly within a digital system.

Alternatively, if values of metered consumption are converted to a standard form (by multiplying the individual rates of consumption by a constant X), these standard forms can be aggregated. We can then calculate an aggregate consumption for an Aggregation period by multiplying this value by the Aggregation Period Weighting and dividing the result by X. The value of X could conveniently be the aggregate weighting during some extended period.

Where Metered Periods are relatively long, it may be reasonable to round meter readings to, for example, a day (even where the Accounting Period is shorter than a day). The system could then be embodied in a system where each meter register is separately considered and the rate of consumption for each meter register reading calculated by an embodiment of the present system as shown in FIG. 1 (or FIG. 2), these rate values then stored in a table (or appropriate memory or storage sub-system) where the table is organised to store a rate value per meter register per period and where the calculated rate produced by the system is stored in the table for the associated meter register for all of the periods contained in the Metered Period. The rate value for the meter register, or a figure derived from it, could also be stored in the table for all future periods. It would be convenient to design the system such that the periods used to store values in the table are equal to the Aggregation Periods. The table can be illustrated as:

| Meter/NR/register# | P1 | P2 | P3 | P4 | P5 | P6 |
|---|---|---|---|---|---|---|
| M1/1/1 | ... | ... | ... | ... | ... | ... |
| M2/2/2 | ... | ... | ... | ... | ... | ... |
| M3/2/1 | ... | ... | ... | ... | ... | ... |
| M3/2/2 | ... | ... | ... | ... | ... | ... |
| M4/1/1 | ... | ... | ... | ... | ... | ... |
| M5/1/1 | ... | ... | ... | ... | ... | ... |

Here, P1 to P6 are Aggregation Periods; M1, M3, M4, and M5 are all single register meters (indicated by the value of NR—Number of Registers); and M2 and M3 are both twin register meters (again indicated by NR).

For each element in the table, a value for rate of consumption can be produced (which could conveniently be stored as a standard form floating point number). Using the table it is possible to aggregate all of the rate values for a given period where the value of NR and register # (register number or register identifier) are the same. This would produce aggregate rates of consumption for each type of meter register (but assumes that all meters with the same number of registers are similarly configured).

Using an aggregate rate of consumption, a value of consumption can be determined for any period by multiplying the aggregate rate by the weighting for the period. If more than one type (set) of weighting values are used (for example, for different types of consumer), then it may not be desirable to mix rate information based upon different types of weighting. Thus the aggregate rate could, or should, be calculated for those meter registers associated with the same type of weightings. The aggregate rates may also be calculated per pattern of register switching times. Thus in the above example, NR may also specify the switching configuration and/or the type of weightings used and not just the number of registers.

Once a value of consumption, either for an individual metered supply or for a group of supplies (or consumers), is produced for a period, such as an Accounting Period, during which a single per unit price can be set then it is possible to determine a charge for the consumption. FIGS. 4 and 5 show embodiments of the present system that produce a value of consumption, and a charge, for a single value of Metered Consumption for a single Accounting Period and, as described, this can be extended to produce a value of consumption or charge for any period.

Figure 6:
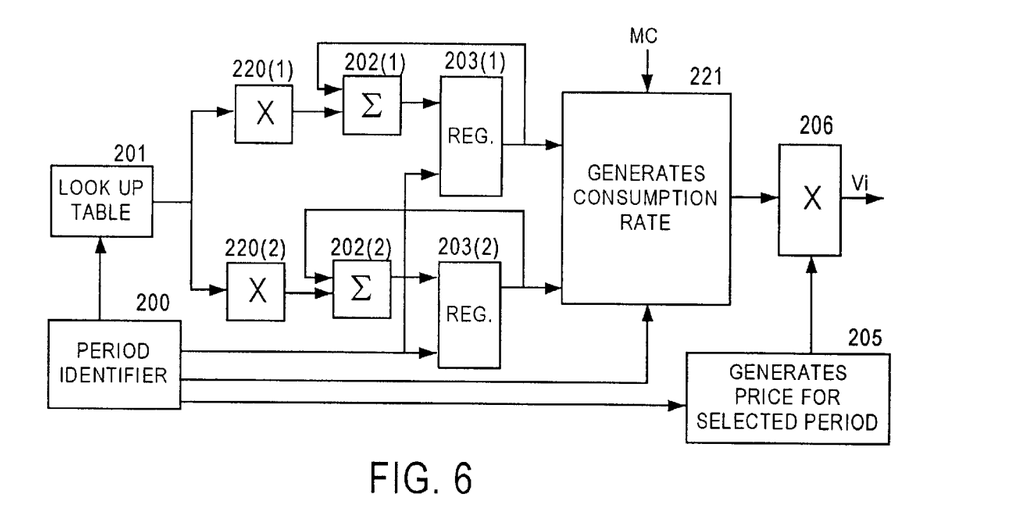
FIG. 6 shows a form of the present system whereby a value of consumption and or a value of charge can be produced for a period other than the metered period

The embodiments of the present system shown in FIGS. 4 and 5 enable a price (charge) to be determined for any period for which a unit price is set. If this is an Accounting Period then the system in FIGS. 4 and 5 are adequate. If the same unit price is set for a plurality of Accountings Periods then the circuit can be modified as shown in FIG. 6 to calculate a price for a number of Accounting Periods (not just a single period). Units 220(2), 202(2), and 203(2) aggregate weighting for the Metered Period as before. Units 220(1), 202(1), and 203(1) aggregate weighting for the period during which a charge needs to be determined and during which a constant price is set. Unit 221 then multiplies the value of Metered Consumption by the weighting for the charging period (output of unit 203(1)) and divides the result by the aggregate weighting for the Metered Period (output of unit 203(2)). This produces a value of consumption for the charging period which can be multiplied by a price (output of unit 205) by unit 206 to produce a charge. This requires unit 200 to select each Accounting Period, thereby allowing unit 221 to produce the value of consumption for the charging period, and then enable unit 205 to produce the price for the charging period.

Figure 7:
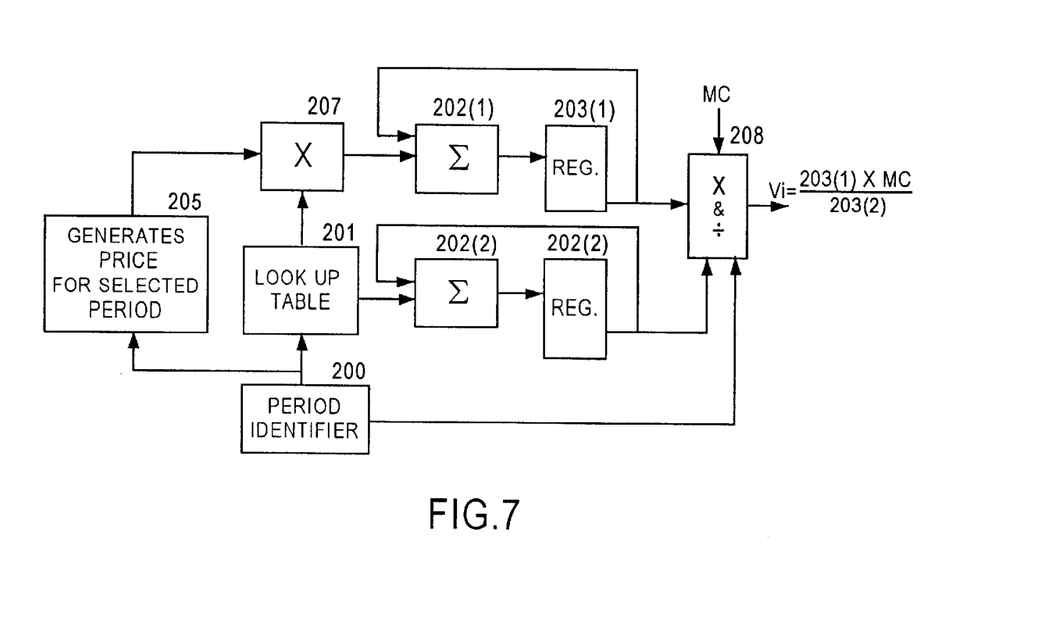
FIG. 7 shows a form of the present system whereby a value of charge can be produced for a period other than (a) the metered period and (b) the periods used to set prices.

Alternatively, within the present system the circuit can be modified as shown in FIG. 7. Again unit 200 will output the Accounting Period identifiers to unit 201, which generates the Weighting value for the currently selected period. Using units 202(2) and 203(2) these Weightings are, under the control of unit 200, accumulated for the Metered Period to produce Wt. This is similar to the operation of the previously described systems.

Unit 200 also outputs the period identifier to unit 205 which is a lookup table of price for each Accounting Period (or other means to generate the price for a period). The output of unit 205 is then connected to unit 207.

Unit 201 outputs the Weighting for the currently selected period to unit 207. Using the price (from unit 205) and Weighting for the selected Accounting Period (output of unit 201) unit 207 generates an output (referred to as the Weighted Price) which is the Accounting Period's Weighing multiplied by price (thus unit 207 is a multiplier whose output is the result of multiplying the unit's two inputs—price and Weighting).

Under the control of unit 200, the units 202(1) and 203(1) produce the aggregate of the Weighted Price for all Accounting Periods selected by unit 200 (which should be all Accounting Periods contained in the Metered Period of MC). At the start unit 200 (or other control means) will reset unit 203(1) and unit 203(2). For each Accounting Period unit 202(1) adds the current Weighted Price (output of unit 207) to the current value of unit 203(1) (which will initially be zero). Under the control of unit 200, the output of unit 202(1) is then loaded into 203(1). This will be repeated for each selected Accounting Period. As previously described, unit 200 could select Accounting Periods not contained in the Metered Period provided that units 203(1) and 203(2) are not updated (loaded with new values) for those periods.

Once unit 200 has cycled through all periods within the Metered Period, it can then enable unit 208 which multiplies the output of unit 203(1) by MC (the value of Metered Consumption for the period D1 to D2) and divides the result by Wt (the output of unit 203(2)). This will produce a charge for the Metered Consumption for the Metered Period.

The implementation shown in FIG. 7 assumes that unit 200 only selects Accounting Periods within the Metered Period and all are wholly contained in the Metered Period. Where this is not the case, then an alternative to control of units 203 is for a unit 220 to be added between unit 201 and unit 202(2) and another unit 220 to be added between unit 207 and unit 202(1).

Figure 8:
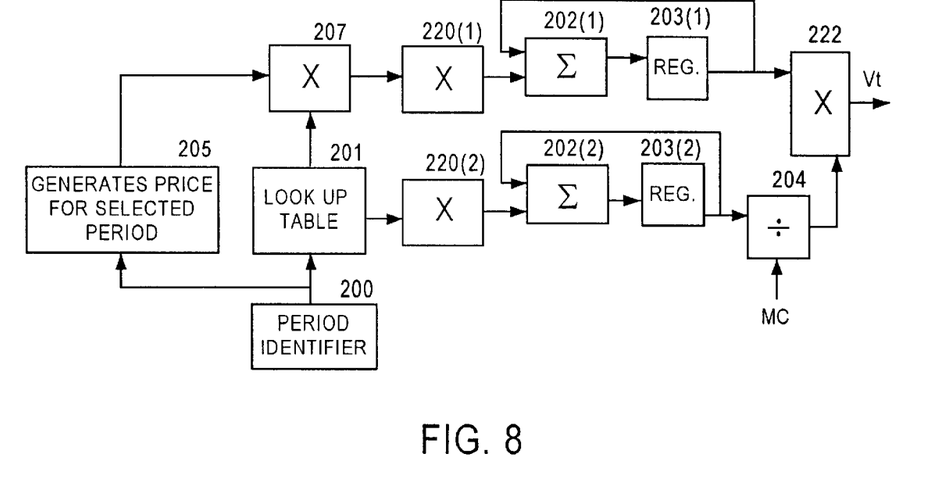
FIG. 8 shows an alternative form of FIG. 7.

FIG. 8 shows a circuit that produces the rate of consumption (output of unit 204) as per FIG. 1 (and FIG. 2). Units 220(1), 202(1), and 203(1) produce a weighted price. By controlling unit 220(1) (specifically the multiplication factor F used by unit 220(1)), the weighted price can relate to any period (Charging Period). Unit 222 multiplies the rate of consumption (generated by unit 204 as previously described) by the weighted price to produce a price (charge) for the Charging Period. Unit 220(2) and/or the control of unit 203(2) must reflect the Metered Period of MC.

Figure 9:
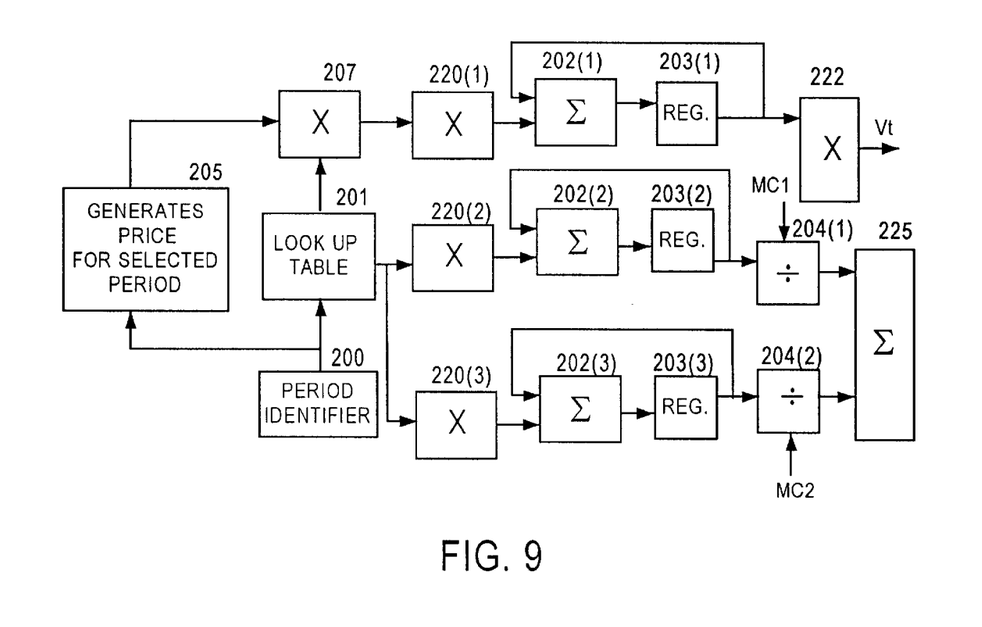
FIG. 9 shows a system that can produce a single charge value for a period for multiple values of metered consumption.

FIG. 8 could be implemented in a system that calculates the aggregate rate of consumption for a number of similarly configured meter registers (as previously described). These could be aggregated for an Aggregation Period, and this could conveniently be the same as the Charging Period. Multiplying weighted price by aggregate rate of consumption will produce a price (charge) for all of the meter registers (metered locations) represented by the aggregate rate. This is a technically efficient means to produce a charge value. FIG. 9 shows such an embodiment of the present system that supports two values of metered consumption. It can obviously be extended to support a plurality of values. Units 220(3), 202(3), and 203(3) produce the aggregate weighting for the Metered Period of MC2. The rate of consumption corresponding to MC2 is then produced by unit 204(2). Unit 204(1) produces the rate of consumption corresponding to MC1. There is no requirement for the Metered Periods of MC1 and MC2 to be equivalent. However, both should relate to the same type of weighting. Unit 225 adds the inputs to produce an aggregate rate of consumption. Thus if MC1 and MC2 relate to different metered locations, the output of unit 225 is the aggregate rate for both locations. Units 220(1), 202(1), and 203(1) can produce the aggregate weighted price for any period (the Charging Period). The output of unit 222 is then a price (charge) for the period corresponding to the aggregate weighted price (output of unit 203(1)). It is generally intended that the Charging Period is contained in (is a sub period of) the Metered Periods for both MC1 and MC2. However, where this is not the case the embodiment of the present system shown in FIG. 8 provides an estimated charge for the Charging Period (assuming simultaneous consumption during the Charging Period at each of the metered locations (meter registers) represented in the output of unit 225).

As noted, different types (or sets) of weighting can be used to distinguish different types of customer, different patterns of switching registers, etc. The system proposes a means to produce a weighted price by aggregating the result of multiplying the weighting for each Accounting Period by the price for the period. When supplying electricity (and other commodities) there are losses from the distribution of the electricity. These losses are dependent on many factors and whilst they can be estimated are difficult to accurately determine. Generally estimated loss factors are used for different types of consumer depending upon where they are connected to the distribution network and their pattern (or level) of consumption. It is therefore generally possible to define loss factors for a particular group of consumers on a per Accounting Period basis (or for groups of Accounting Periods). Since loss factor is, at least in part, dependant upon the pattern of consumption it may be related to the type (value) of weightings used. In the circuit shown in FIG. 8 (and FIG. 9) loss factor can additionally be input to unit 220(1) which then implements the function WP×F×L, where WP is the weighted price from unit 207, F is the value previously described (and possibly generated within the unit 220 rather than by unit 200) and L is the loss factor. The output of unit 222 will then be a price (charge) accounting for estimated line loss. Obviously the output of unit 207, or unit 205, could be multiplied by loss factor rather than implement it within unit 220(1). Alternatively, in FIG. 4 or 5 the input to unit 221 from unit 201 or, in the case of FIG. 4, unit 226(1) can be multiplied by L and the output of unit 221 will then be adjusted for estimated line loss. Similar modifications can be made to the circuits shown in FIGS. 6 and 7.

It may also be necessary or desirable to balance the value produced to some overall value. For example, in the supply of electricity, the electricity supplied into the distribution network may be metered using Network Metering.

For some area (section of the distribution network) the total network demand in an Accounting Period (i) can be referred to as Ni. For each Accounting Period, it is possible to measure this demand at the inputs to the network using advanced metering and data collection.

Within the network corresponding to Ni there may be some sites which also meter consumption during the Accounting Periods (or for which values of consumption can be derived by some prior art means for Accounting Periods). The Total of such consumption in an Accounting Period i can be defined as Mi. The difference between Ni and Mi is obviously the consumption not accounted for by those sites represented by Mi. This difference can be referred to as Di or the Residual Network Demand. However, in determining the Residual Network Demand, it may be appropriate to scale either Ni or Mi by an adjustment factor to compensate for loss within the corresponding network. Thus $$Di=f(Ni)-Mi$$

or $$Di=Ni-f(Mi)$$

where f is a function to adjust for network loss and can conveniently be a simply scaling factor (although the scaling factor may be Accounting Period specific). The scaling factor could also be specific to individual metering systems and thus Di could be expressed as $$Di=Ni-\Sigma f(Mi)$$

where f(Mi) is the function of individual metered consumption (adjusting for loss) and the summation is for all locations with means capable of providing Metered Consumption for the Accounting Period i.

The Residual Network Demand will be the demand within the distribution network representing the consumption of all locations not metered with advanced metering. The present system can be used for such locations to determine the consumption, rate of consumption and or charge for a particular period, including an Accounting Period.

The present system additionally includes means to adjust values in dependence to the Residual Network Demand. This is achieved by producing a Compensation Factor (CF) that can be applied to (1) weighted price, (2) price, (3) rate of consumption, (4) a value of consumption, (5) a charge (value of consumption multiplied by price or rate of consumption multiplied by weighted price), or (6) the weightings used to generate weighted price. The Compensation Factor can be generated either for individual Accounting Periods or for any other period (referred to below as an Extended Period).

As previously described, it is possible to multiply aggregate rate of consumption with the weighting for a particular Accounting Period to produce a value of consumption for that Accounting Period. Also, as previously described, it is possible to calculate a charge for a particular Accounting Period. If a value of consumption or charge can be produced for the Accounting Period (either by means of the present system or otherwise) for all consumption points not represented by Mi, then they can be aggregated to produce a Total Consumption or Total Charge for the Accounting Period.

The Compensation Factor can be produced for an Accounting Period by either (1) dividing the Residual Network Demand by the Total Consumption or (2) Multiplying the Residual Network Demand by the unit price for the Accounting Period (producing a Residual Charge) and dividing the result by the Total Charge. In order to account for individual loss (for different types of consumption/consumers), however, either (a) the Residual Network Demand is calculated by a form of the equation or (b) Total Consumption and Total Charge account for estimated line loss (for example unit 220(1) implements the function WP×F×L as mentioned above). If neither of these options is implemented (ie loss is not accounted for within the calculations), then the Compensation Factor can be used to and will adjust values for an average actual value of loss.

Multiplying the rate of consumption by the weighting for an Accounting Period and multiplying the result by the corresponding Compensation Factor will produce an adjusted value of consumption. If performed on an Accounting Period basis, the aggregate of these adjusted values for all locations in the distribution network will equal the residual demand in the network.

Thus the Compensation Factor can be defined as $$CF_i = (\text{Residual Network Demand})/\Sigma(R \times L \times W_i)$$

where R is the aggregate rate of consumption for a given group (or individual metered point or meter register) and L is the loss factor for the group and the summation is for all such groups (or individuals) within the network corresponding to the Residual Network Demand. This calculation is performed for each Accounting Period with the values for that Accounting Period. If the Compensation Factor is calculated for each Accounting Period then unit 220(1) in various embodiments of the present system (including those in FIGS. 8 and 9) can implement the function WP×F×L×CF (where CF is the above Compensation Factor).

Obviously it would also be possible to modify unit 207 (or even unit 205 or the output of unit 201 that is connected to unit 207) to incorporate any part of the function WP×F×L×CF.

For a period (the Extended Period) which is a finite integral number of Accounting Periods, a Compensation Factor can be generated for the Extended Period if the Total Charge and or Total Consumption are available for each of the Accounting Periods contained in the Extended Period. This can be achieved by producing (1) the sum of Residual Network Demand, (2) the sum of Residual Charge, (3) the sum of Total Consumption, and (4) the sum of Total Charge for all Accounting Periods in the Extended Period.

Dividing the sum of Residual Network Demand by the sum of Total Consumption will produce a Compensation Factor that will adjust values so that, over the Extended Period, the values of consumption produced by the present system equal the sum of Residual Network Demand. Dividing the sum of Residual Charge by the sum of Total Charge will produce a Compensation Factor that will adjust values so that, over the Extended Period, the values of charge produced by the present system equal the sum of Residual Charge. Depending upon the requirements for a particular embodiment of the present system, the Compensation Factor for an Extended Period can be produced by either means. The Extended Period Compensation Factor can be applied to either (1) values that correspond to sub periods of the Extended Period (for example, values corresponding to individual Accounting Period) or (2) values corresponding to the Extended Period. For example, Extended Period Compensation Factor can be applied to a values of consumption for each individual Accounting Period in the Extended Period or a single value of consumption for the whole Extended Period.

It was proposed above that the values of rate of consumption could be stored in a table recording rate per meter register per Aggregation Period. it was also proposed that a rate based upon previous information could be used as an estimate for subsequent periods. Thus for any Aggregation Period there could be a value of rate of consumption that is either based upon a meter reading that encompasses the Aggregation Period or is an estimate. Because most Metered Periods are relatively long, then immediately after a particular Aggregation Period all values may be estimates (ie no meter readings have been obtained encompassing the recent Aggregation Period). The present system provides a means whereby these estimated rates of consumption can be adjusted at the outset to remove any overall error in the values. Using these estimated rate of consumption values, the system can produce a compensation factor which balances the system to the residual demand over the Aggregation Period. This compensation factor can be applied to the values of rate of consumption (by multiplying the rate by the compensation factor) to adjust the values thereby producing a balanced system. In so doing the compensation factor cancels the errors in the estimates (overall).

The adjusted values of estimated rate could also be stored back into the table. If the system then recalculated the compensation factor, using the new adjusted rates of consumption, the new compensation factor would be unity (ie the system is already balanced). However, subsequently some meters will be read and metered data obtained. This will enable the rates of consumption to be calculated that are valid in all Aggregation Periods within the corresponding Metered Periods, and these will replace the adjusted estimates in the table (or original estimates if the adjusted values are not written back). Thus if the compensation factor is recalculated to account for the changed data, the new compensation factor produced by the system would not be unity (except by chance). The nonunity compensation factor could, for example, then be used, as described above, as an input to unit 220(1) in the calculation of weighted price.

It should be noted that FIG. 8 will operate successfully where the Aggregation Period is an Accounting Period and where 220(1) calculates the weight price for that Aggregation Period (possibly adjusted for loss factor and optionally using the compensation factor).

Figure 10:
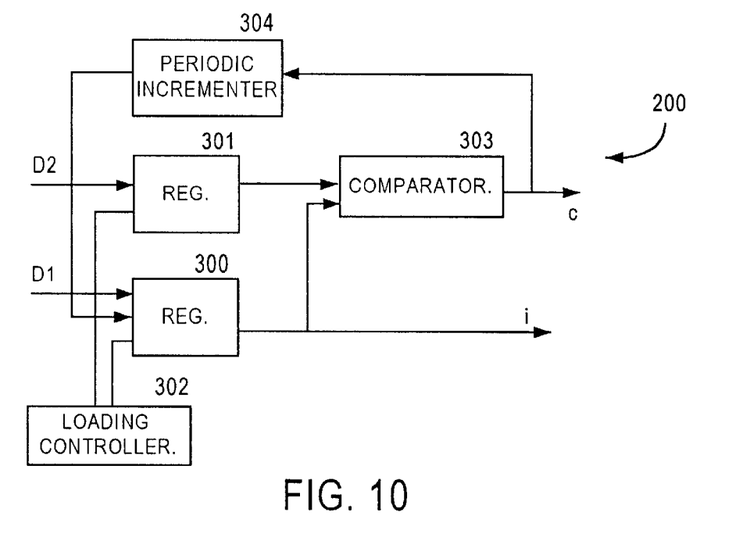
FIG. 10 shows unit 200 of FIG. 1.

FIG. 10 shows a possible implementation of unit 200. It is assumed that D1 and D2 are provided as integer values representing the Accounting Period corresponding to the start of the Metered Period (D1) and the Accounting Period corresponding to the end of the Metered Period (D2). Obviously an implementation may adopt different representation for D1 and D2 without changing the behaviour of the circuit. The circuit shown in FIG. 10 assumes that the Metered Period is continuous (or unit 220 is used where the multiplication factor F reflects the Metered Period) and that D2 is the last Accounting Period within the Metered Period (ie it is inclusive). As previously described, unit 200 can select Accounting Periods not contained within the Metered Period provided that either a unit 220 is used (and appropriately configured) or the control of unit 203 does not cause the unit 203 to be loaded for periods not contained in the Metered Period. In such an implementation D1 can be an identifier for any period prior to the start of the Metered Period and D2 can be an identifier for any period after the end of the Metered Period.

Unit 302 controls the loading of D1 and D2 into registers 300 and 301 respectively (unit 300, in the example, is actually a loadable counter). Associated with unit 300 and unit 301 are validity flags (not shown) which indicate that data has been loaded into the associated register. These flags are connected to unit 304. When both flags are valid (or when unit 304 knows, or can rely on, the values in units 300 and 301 being present) unit 304 can periodically increment unit 300 until the output of unit 303 (which is a comparator) is true (the outputs of unit 200 and unit 301 are equivalent). Thus unit 304 will repeatedly increment unit 300 until its value equals the value of unit 301 (ie it will cycle through all of the Accounting Periods between D1 and D2 inclusive).

The output of unit 300 (labelled i) can be used to identify the currently selected Accounting Period. In FIG. 7 it can be connected to unit 201 and unit 205. Where a unit 220 determines the degree to which an Accounting Period is contained within the period associated with the particular unit 220 then the output of unit 300 could be connect to such unit 220.

The output of unit 303 indicates when the control logic has sequenced through all of the Accounting Periods. In FIG. 7 the output of unit 303, or a delayed version thereof, can be connected to unit 208 (as shown) to enable that unit. It could also be connected to external circuitry to indicate the validity of unit 208's output. It may also be used to prevent a unit 203 from being loaded (ie their value is final). Within the system it may be necessary for a clock signal to be used to control the various units. It is convenient for unit 304 to generate such a signal or to otherwise control the overall operation.

In the present system, it is proposed that Metered Consumption can be apportioned to sub-periods, or a cost determined, where the Metered Period is not continuous. In the embodiments of the present system described so far this requires modification of unit 200 or for a unit 220 to be used with a factor indicating the degree to which the associated period contains the current Accounting Period (the multiplication factor F). In FIG. 10 unit 304 will cause unit 300 to increment (with intervals sufficient for the other circuitry/logic to operate) until it reaches a value defined by unit 301. The circuit in FIG. 10 can be modified in a variety of ways in order that non-continuous Metered Periods can be supported. One way that the present system proposes is to modify unit 200 such that: (1) it does not output a period identifier (i) for Accounting Periods which are not part of the Metered Period; and/or (2) unit 200 (or other control unit) does not cause the associated unit 203(s) to be loaded with a new value except when the selected Accounting Period is part of the Metered Period; and/or (3) a unit 220 is used to nullify periods that are not part of the Metered Period.

Option 1 can be achieved by modification to unit 300 in FIG. 10. Where unit 200 is required to select a non sequential set of periods, unit 300 can be arranged to sequence through the required set, outputting an identifier for each. This could be done, for example, by implementing a non-sequential counter where the value loaded on each clock signal is a non-sequential function of the previous value. Alternatively a lookup table (memory, programmable logic device or similar) could be programmed to convert a sequential number into a corresponding period identifier. For example, the required non-sequential set of periods representing a Metered Period could be Accounting Periods {1, 3, 5, 6, 9, 11}. Thus the lookup table could implement the conversion:

| Input | Output |
|-------|--------|
| 1 | 1 |
| 2 | 3 |
| 3 | 5 |
| 4 | 6 |
| 5 | 9 |
| 6 | 11 |

A sequential counter can then be used to provide the input to the lookup table. Thus, unit 300 would, in this example, consist of a sequential counter connected to a lookup table (or other circuit) programmed for the required set of periods. Unit 303 would compare the output of the lookup table with the output of unit 301.

Figure 12:
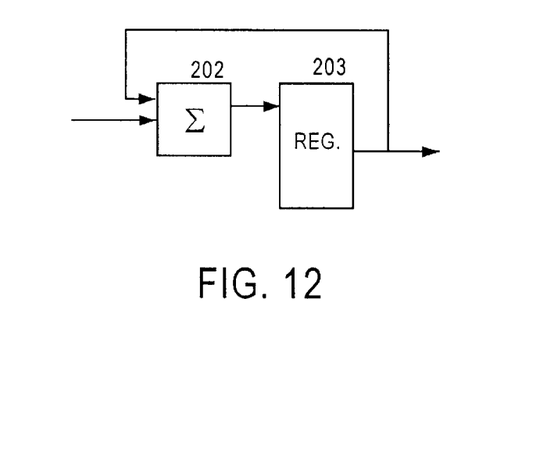
FIG. 12 shows a circuit comprising a unit 202 and unit 203.

An alternative embodiment of the present system is explained by reference to FIGS. 12 and 13. Considering a metered location over a period of time (referred to as the Extended Period) then, where the Extended Period is greater than a Metered Period, Metered Consumption data may be available for a plurality of Metered Periods (ie the Extended Period may equate to a plurality of Metered Periods). Potentially the metering may be multi-rate or may record consumption during defined periods. Alternatively, it may be single-rate and will be read occasionally, providing Metered Consumption for the intervals between successive reads. For an Extended Period there may therefore be a plurality of Metered Consumption values from one or more meters. The following embodiment of the system is intended to support such a plurality of Metered Consumption values but can equally be applied to a single value. FIG. 12 illustrates the circuit previously used to accumulate a value. The circuit operates and is controlled by external means as previously described.

Figure 13:
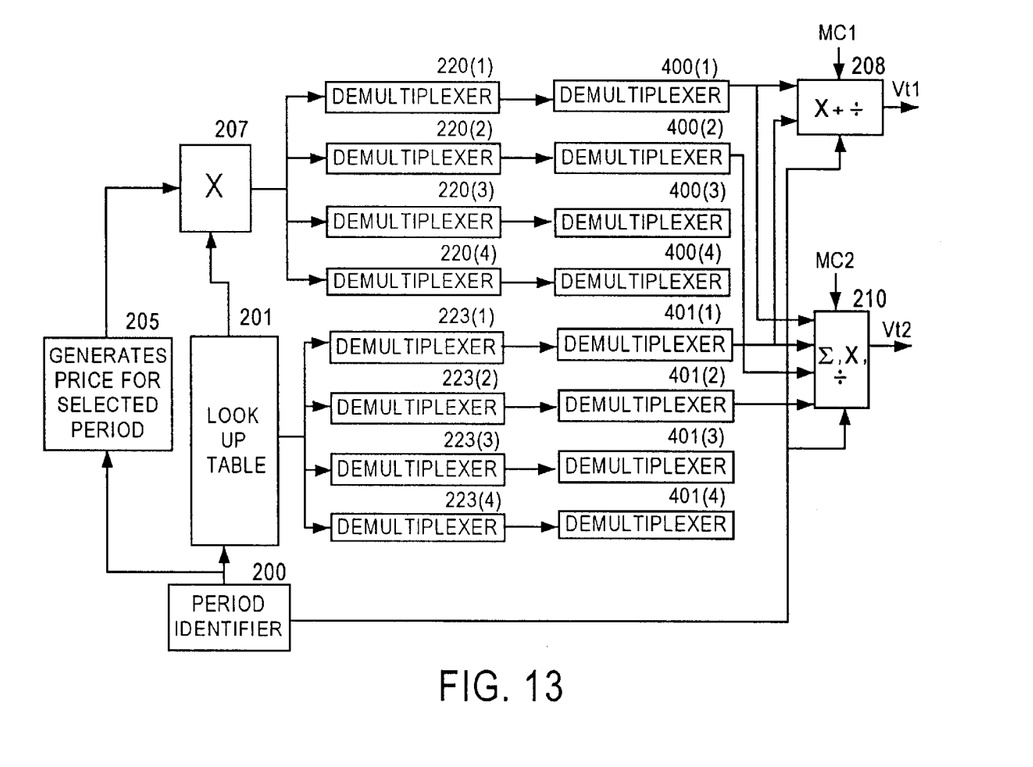
FIG. 13 shows a system whereby charge values can be produced for multiple values of metered consumption where the charge value for a particular value of metered consumption relates to the metered period.

FIG. 13 shows the proposed system. The Accounting Period identifier (i) from unit 200 is connected to unit 201 and to unit 205. These operate as described in the other implementations and their outputs are connected to unit 207 which also operates as previously described. The period identifier is also connected to each unit 220 and unit 223 (where each unit 223 is simply a unit 220 labelled to differentiate it from the unit 220 which are used for the calculation of weighted price in this embodiment of the present system).

For the selected Accounting Period, the Weighted Price (output of unit 207) and Weighting (output of unit 201) are connected to units 220 and 223 respectively. These units are both forms of unit 220. Each unit 220 corresponds to a similarly suffixed unit 223. Thus unit 220(1) corresponds to unit 223(1) (together they form a pair) and both are designed to support the same period (the Supported Period). The system can be implemented with a plurality of such pairs of units each having a different Supported Period.

The period identifier for the selected Accounting Period will be output from unit 200 to all unit 220 and unit 223.

Each unit 220 and unit 223 will then derive its own value of multiplication factor F depending upon the degree to which the selected Accounting Period is contained within that unit's Supported Period. Attached to each unit 220 is a unit 400 which contains the circuit shown in FIG. 12. Each will produce the weighted price for the Supported Period of the associated unit 220. Attached to each unit 223 is a unit 401 which also contains the circuit shown in FIG. 12. Each will produce the aggregate weighting for the Supported Period of the associated unit 223.

If unit 200 selects each Accounting Period in turn, then the system will produce all of the respective aggregate weightings and weighted prices. If a value of Metered Consumption is available, then it is possible to calculate the rate of consumption by dividing the value of Metered Consumption by the aggregate weighting for the corresponding Metered Period. Where the Metered Period equates to a set of Supported Periods (without overlap or omission), then the aggregate weighting and weighted price for each of the Supported Periods in the set can be respectively added to produce the total aggregate weighting and weighted price for the Metered Period. These values can then be used as described above. In FIG. 13 unit 210 implements the addition of aggregate weighting and weighted price for two Supported Period to produce total values for the Metered Period corresponding to the value of Metered Consumption MC2 (ie the Metered Period is equal to the aggregate of the two Supported Periods) and unit 210 then divides MC2 by the aggregate weighting for the Metered Period (producing the corresponding rate of consumption) and multiplies the result by the weighted price for the Metered Period producing a price (charge) for the metered period. As previously described, units 220 can include multiplication of weighted price by line loss factor and or Compensation Factor. Alternatively if Compensation Factors are calculated for Extended Periods (where the Extended Periods are the Supported periods for the units 400), then the Extended Period Compensation Factors can be used to multiply the outputs of the respective units 400.

FIG. 13 can be used to support a plurality of values for metered consumption. The circuit shown provides a unit 208 to support metered consumption MC1 where the Metered Period equates to a single Supported Period. The unit 208 then divides MC1 by the aggregate weighting from unit 401(1) (producing a rate of consumption) and multiples the result by the weighted price from unit 400(1) thereby producing a charge for the Metered Period.

Figure 11:
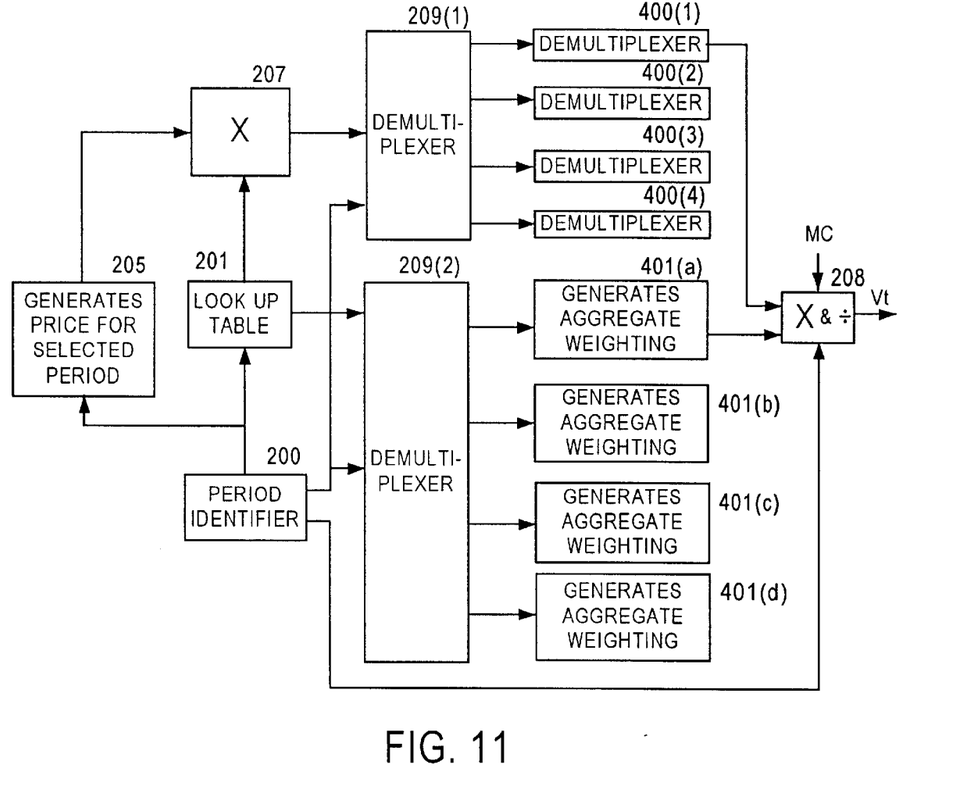
FIG. 11 shows a system whereby charge values can be produced for multiple values of metered consumption where the value of charge for a particular value of metered consumption relates to a period that may be different to the metered period.

The system shown would only support a single type (set) of weighting and thus all values of metered consumption should be associated with that type of weighting. The system could be easily replicated with different instances supporting different types of weighting.

Where none of the Supported Periods overlap with each other, it would be possible to implement all of the units 220 as a switch or demultiplexor which outputs the current weighted price (for the selected Accounting Period) to one unit 400. Similarly all of the units 223 could be implemented by a similar switch or demultiplexor to output the weighting for the currently selected period to one unit 401. Such an embodiment is shown in FIG. 11 with unit 209 providing a switch, or demultiplexor. Unit 209(1) replaces units 220 and unit 209(2) replaces units 223. In addition to a demultiplexor unit 209 could also implement the multiplication factor F (as per unit 220) and unit 209(1) could multiply the primary input by loss factor and or compensation factor (CF) (as previously described with reference to unit 220).

The system can also easily support a plurality of units 208 and units 210 where the values of metered consumption relate to different location (customers) or meter registers in the distribution network.

Figure 14:
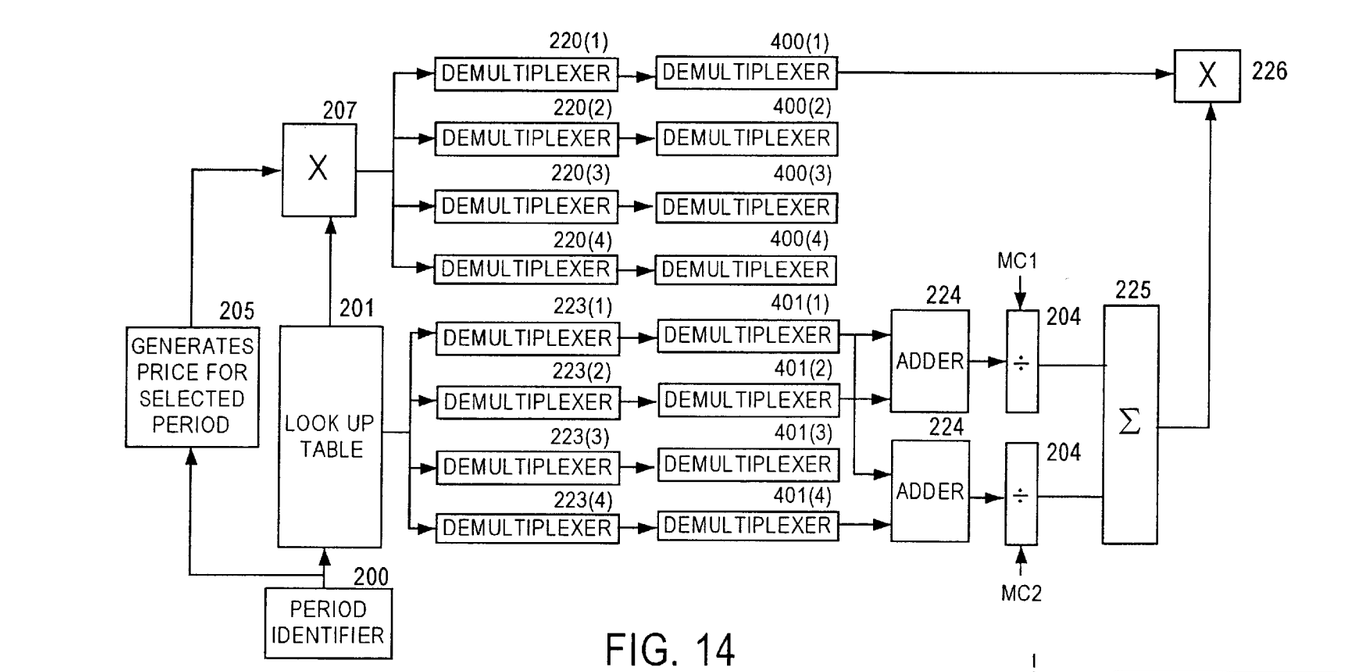
FIG. 14 shows a system whereby rates of consumption are produced from values of metered consumption and these rate of consumption are then aggregated prior to a charge being produced.

FIG. 14 shows a further implementation of the system. Units 200, 201, 205, and 207 operate as previously described. Each pair of units 223 and 401 produces a aggregate weighting for a Supported Period. Each pair of units 220 and 400 produce a weighted price for a Supported Period. However, in FIG. 14 there is no strict requirement for the Support Periods of a unit 220 to equal those of the corresponding unit 223 (or for there to be a correspondence between a unit 220 and a unit 223).

Unit 224 adds the aggregate weightings from appropriate units 401 to produce a total aggregate weighting corresponding to the Metered Period of a value of Metered Consumption. A unit 204 then produces a rate of consumption per unit weighting. A plurality of units 224 and units 204 can thereby produce the values of rate of consumption for a plurality of values of Metered Consumption. Within a particular embodiment of the present system it would be possible for various units 224 to share common circuitry where appropriate to do so.

Where the rates of consumption values encompass a common period (an Aggregation Period), they can be added, and an example of this is illustrated by unit 225, which adds two values of rate of consumption. The output of unit 225 is an aggregate rate and this can be used as previously describes. In FIG. 14 the output of unit 225 is connected to unit 226 which multiplies it with a weighted price thereby producing a price (charge) for the Supported Period (the Charging Period) corresponding to the weighted price (the output of unit 400(1)). A unit similar to unit 224 could also be used to aggregate weighted price outputs from some set of units 400 and the total aggregated value of weighted price can then be used by a unit 226 to calculate a price corresponding to the aggregate of the corresponding Supported Periods.

Units 225 and/or 226 can be replicated to produce rates of consumption and/or charges for a plurality of Aggregation Periods and/or Charging Periods.

What is claimed is:

1. Apparatus adapted to be responsive to sources of plural metered or recorded consumption values, each representing consumption during a finite metered period (the Metered Period) and a set of weightings defined for successive accounting periods (Accounting Periods), each metered period being of longer duration than the accounting periods, the apparatus comprising:

means for determining the metered period aggregate weighting for each metered period by summing the weightings for those accounting periods encompassed by the metered period, said means for determining being connected to be responsive to signals indicating numeric values of the periods, and means connected to be responsive to the means for determining for producing a rate of consumption indication by dividing an indication of the consumption value by an indication of metered period aggregate weighting (the Metered Period Aggregate Accounting Period), said means for producing being connected to be responsive to the means for determining.

2. Apparatus according to claim 1 including means for generating an indication of the sum of the weighting during each of a plurality of Supported Periods (the Supported Period Weightings) (where Supported Periods do not overlap with each other and where the Metered Period for a value of metered consumption corresponds to a set of Supported Periods (the Included Periods), and further including means for producing an indication of the Metered Period Aggregate Weighting as the sum of the Supported Period Weightings for the Included Periods.

3. Apparatus according to claim 1 wherein one or more of said Accounting Periods are partially contained within the Metered Period and wherein the Metered Period is rounded so there is a whole number of partially contained Accounting Periods.

4. Apparatus according to claim 1 further including means for storing (a) the rate of consumption indication for a set of one or more of said Accounting Periods (an Aggregation Period) and (b) rate of consumption produced from the metered consumption value for all of said Aggregation Periods contained in the Metered Period.

5. Apparatus according to claim 1 further including a control unit that is common to the means for producing.

6. Apparatus according to claim 1 further including means for generating a set of the weightings, and wherein the means for producing the rate of consumption indication is arranged for producing different values of metered consumption, the means for producing the rate of consumption indication and the means for generating the set weightings being common to each other.

7. Apparatus according to claim 1 wherein the means for determining includes means for producing the indication of aggregate weighting for a Charging Period (the Charging Period Aggregate Weighting) which is a set of one or more Accounting Periods, and for multiplying one or more of the rate of consumption indications by the Charging Period Aggregate Weighting, thereby producing corresponding values of consumption for the Charging Period.

8. Apparatus according to claim 1 further including means for producing: (a) a Compensation Factor indication for a certain period by dividing an indication of value of Residual Network Demand by a Total Apportioned Consumption indication wherein: the value of Residual Network Demand during the certain period is determined from an indication of total commodity supplied to a particular network during the certain period minus Consumption for the certain period for some set of metered locations (the Excluded Locations) ; (b) a value of consumption indication for the certain period (the Apportioned Consumption) for all consumption points within the particular network other than the Excluded Locations; and (c) the Total Apportioned Consumption indication for the certain period by aggregating the Apportioned Consumption for all consumption points other than the Excluded Locations.

9. Apparatus according to claim 1 further including means for multiplying the indication of aggregate weighting for a given one of the Accounting Periods by a per unit price for said given one of the Accounting Periods to produce an indication of Weighted Price for said given one of the Accounting Periods and then to produce an indication of the sum of a plurality of the indications of Weighted Prices for all Accounting Periods contained in a Charging Period (the Charging Period Weighted Price).

10. A method of producing an indication of consumption rate in response to plural indications of metered or recorded consumption values, each representing consumption during a finite metered period and a set of weightings defined for successive accounting periods, each metered period being of longer duration than the accounting periods, the method comprising:

determining the metered period aggregate weighting for each metered period by summing indications of the weightings for those accounting periods encompassed by the metered period, and producing the indication of rate of consumption by dividing an indication of the consumption value by an indication of metered period aggregate weighting.

* * * * *